July 13, 1965 E. F. TRUMBULL 3,194,524
CLIP STRAP
Filed April 16, 1964
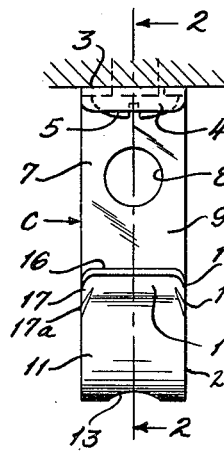
FIG.1
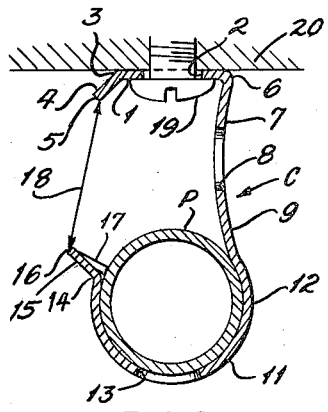
FIG.2
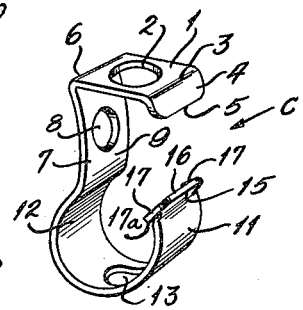
FIG.4
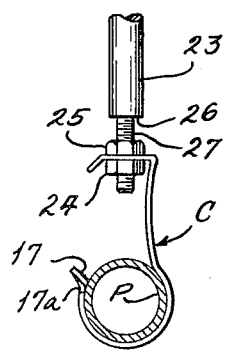
FIG.6
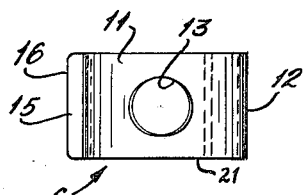
FIG.3
FIG.9
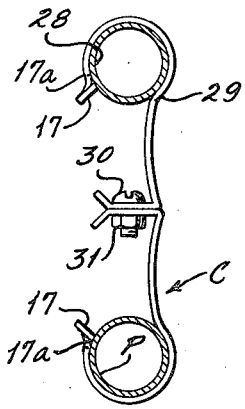
FIG.7
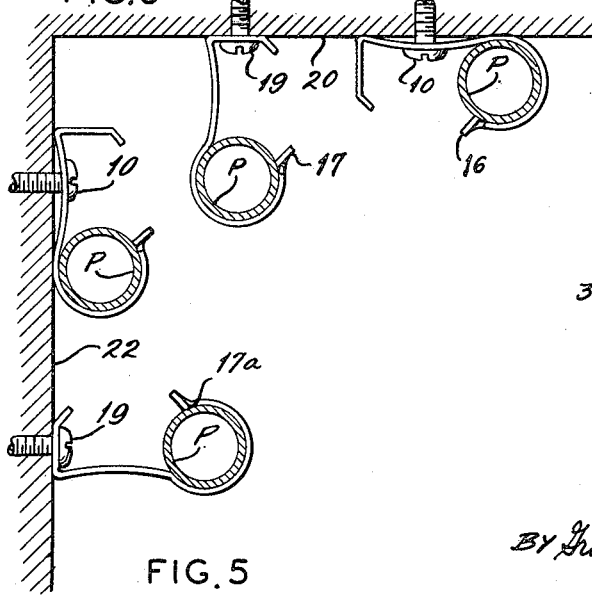
FIG.5
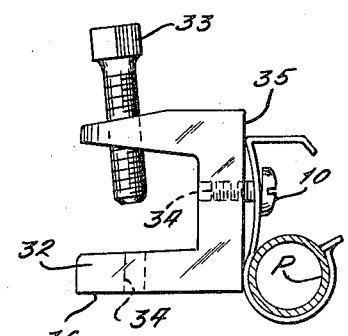
FIG.8
INVENTOR:
EARL F. TRUMBULL
BY Gravely, Lieder & Woodruff
ATTORNEYS United States Patent Office 3,194,524
Patented July 13, 1965

3,194,524
CLIP STRAP
Earl F. Trumbull, Imperial, Mo., assignor to
Richard F. W. Herzberger, St. Louis, Mo.
Filed Apr. 16, 1964, Ser. No. 360,231
9 Claims. (Cl. 248—74)

The present invention relates to an improved clip strap, and more particularly, to a versatile supporting device for pipes or conduits to position the same adjacent to or spaced from a supporting surface, such as a wall or ceiling or other means.

Pipe holders of various shapes are old, but prior art pipe holders have certain disadvantages. Such devices were difficult to apply to the supporting surface, or could be applied only in one way, or the pipe was difficult to insert into the device, or there was a combination of these difficulties.

The principal object of the present invention is to provide a clip strap made of spring steel which can easily be secured to a supporting surface for receiving a pipe or conduit either in contacting relation with the supporting surface or in spaced relation therewith. Another object is to provide a clip hanger in which the screw or bolt head is always in a position to be conveniently rotated with a screwdriver. Another object is to provide a clip strap in which the metal surrounding the hole is shaped so that the clip strap itself acts as a lock washer to prevent the screw from becoming loose. Another object is to provide a clip strap in which the pipe can be snapped into its retained position and held against movement or vibration by projections in the clip strap itself. Another object is to provide a clip strap which can be mounted first in large numbers to save labor costs, with the pipe thereafter merely having to be snapped into position.

These and other objects and advantages will become apparent hereinafter.

The present invention is embodied in a clip strap having a top portion with a hole therein, an upper corner with a spacer portion extending at an angle with respect to said top portion, said spacer portion having a hole therein, a retainer portion for retaining a curved pipe or conduit, said retainer portion having a bottom hole and a forward lip with an edge thereon, and means positioned between said forward lip and said retainer portions for retaining a pipe in said retainer portion.

The invention also consists in the parts and in the arrangements and combinations of parts hereinafter described and claimed. In the accompanying drawings which form part of this specification and wherein like numerals and letters refer to like parts wherein they occur.

FIG. 1 is a front vertical view of a clip strap embodying the present invention supported from a ceiling, FIG. 2 is a vertical cross-sectional view taken along the line 2—2 of FIG. 1 and showing a circular pipe in its retained position, FIG. 3 is a top plan view of the device shown in FIG. 1, but not attached to a ceiling, FIG. 4 is a perspective view of the unattached clip strap itself, FIG. 5 is a side elevational view showing four clips secured to a wall and ceiling to hold pipes in adjacent or spaced relation thereto, FIG. 6 is a side elevational view showing said clip strap hanging from a rod, FIG. 7 is a side elevational view showing two spring clips secured together to hold pipes in spaced relation, FIG. 8 is a side elevational view showing the clip strap secured to an insulator support which can be mounted on a steel beam, and FIG. 9 shows a fragmentary perspective view of the invention illustrating the disposition of the barbed elements relative to a tube.

Referring now to the drawings in detail, it will be seen that the embodiment of the invention which has been illustrated comprises a clip strap C made from spring steel with sufficient temper to maintain the squeeze on the pipe or conduit P and yet not so brittle as to break when excessive pressure is put on said clip strap C to force it open. That is, the metal must be hard enough to retain a pipe under a given amount of pressure and yet soft enough that it will not break when excessive pressure tends to straighten it out. It has been found that spring steel about 0.030 to 0.060 inch thick and from ½ to ¾ inch wide gives satisfactory results for clips of the size which are well suited for use in homes, retail shops, and many installations in factories. These clips are designed to hold pipes having an inside diameter of about ⅝ inch and an outside diameter of 11/16 inch. Of course, other sizes and dimensions for clip straps embodying this invention may be neecssary or desirable for different sizes of pipe, thin-wall conduit, or tubing of any size or kind.

The clip strap C has atop portion 1, which is preferably flat, with a top hole 2 in the center thereof, there being a bend 3 forwardly of said hole 2 to provide an upper lip 4 having an upper edge 5. The top portion 1 has an upper corner 6 at its rearward extremity with a downwardly extending spacer portion 7 having a side hole 8. The spacer portion 7 extends from said upper corner 6 at an angle to said top portion 1 and is curved sufficiently, as at 9, so that it acts as a lock washer for any screw 10 which is inserted through the side hole 8. The curve 9 is a slight curve convexly forwardly, that is, convexly toward said top portion 1. A substantially circular retainer portion 11, which is shaped to receive a circular conduit or pipe P, extends from the spacer portion 7 and is provided with a back edge 12 which is the rearmost portion of the clip strap C, and a bottom hole 13 which is in vertical alignment with the top hole 2. The bottom hole 13 allows entry of a screwdriver to tighten the screw 4 in the top hole 2 and allows sufficient spring or give at this point in the retainer portion 11 when a pipe P is inserted. This allows the clip strap C to be made of heavier gauge material, since the bending to receive a pipe P occurs adjacent to the bottom hole 13. The retainer portion 11 in its free position without a pipe therein is slightly smaller in diameter or size than the pipe P or conduit to be retained, but is adapted to open slightly when receiving a pipe P so as grip and snugly retain it. The forward portion of the retainer portion 11 is provided with a bend 14 which forms a lower lip 15 having a lower edge 16 which is the most forward portion of the clip strap C. The lower lip 15 acts as a guide for the entry of the pipe P. Inwardly extending means, such as burrs or projections 17, are provided at the bend 14 to retain the pipe P within the retainer portion 11. The projections or burrs 17 may be formed by short slits extending angularly inwardly from the retainer portion 11 toward the bend 14 and then bending the burrs 17 out of the plane of the retainer portion 11, so that the pipe P is easily insertable but difficult to remove. These burrs 17 are depressed automatically into the plane from which they were bent by the pipe P as it is inserted and tend to spring inwardly when the pipe P is in its retained position shown in FIG. 2 with the point 17a thereof tending to bite into the pipe P to prevent removal. The forward opening or distance 18 between the upper edge 5 and lower edge 16 is greater than the outer diameter of the pipe P to be retained. The retainer portion 11 has its back edge 12 rearwardly of the upper corner 6 so that the center of the pipe P will be directly beneath the center of the top hole 2, so that the weight of the pipe P is directly below a top screw 19 which is mounted in the top hole 2. The opening 18 is opposite to the side hole 8 so that the shaft of a screwdriver can be rotated conveniently in the opening 18 when the screw 10 is inserted through the side hole 8.

As best shown in FIG. 2, the back edge 12 is positioned rearwardly of the upper corner 6. The lower edge 16 is positioned forwardly of the upper edge 5. The bottom hole 13 is in vertical alignment with the top hole 2, so that a screw 19 may be inserted through the top hole 2 into the ceiling 20 by a screwdriver whose shaft extends through said bottom hole 13. The projections 17 are preferably formed in the parallel side edges 21 of the clip strap C, although said projections or indentations 17 can be formed inwardly from said side edges 21 if desired. The shape of the retainer portion 11 and/or the projections 17 are such that the pipe P must be snapped into position, thereby holding it in a fixed position.

Typical installations showing the use of this spring clip C are shown in FIG. 5 wherein the clip strap C is shown holding pipes P in adjacent or spaced relation to a ceiling 20 and a wall 22. If desired, the clip strap C may be secured to a rod 23 by means of a pair of nuts 24 and 25, as shown in FIG. 6. The use of two nuts 24 and 25 provides for a vertical adjustment. However, if the shoulder 26 above the threads 27 on the rod 23 is at the desired height, then the upper nut 25 is not necessary. If there is a pre-installed pipe, such as the upper pipe 28 shown in FIG. 7, then one clip strap 29 can be hung over said existing pipe 28 and another clip strap C secured thereto by means of a bolt 30 and nut 31 in order to support a second pipe P in spaced relation from said first pipe 28. In this installation, the top portions 1 of the clip straps C and 29 are secured together.

FIG. 8 shows the clip strap C secured to an insulator support 32 which can be mounted on a steel beam. Many new buildings are constructed with steel beams upon which insulator supports 32 may be positioned as desired by turning the bolt 33. These insulator supports 32 have threaded holes 34 in their two forces 35 and 36 for receiving a screw. The clip strap C may be placed in any position on the insulator support 32. Other installations are possible with the clip strap C embodying the present invention. When the clip strap C is secured by the top portion 1, such as shown in FIGS. 2 and 5, the pipe P is spaced from the supporting surface thereby leaving a space for pipe insulation which can be applied afterwards.

This invention is intended to cover all changes and modifications of the example of the invention herein chosen for purposes of the disclosure, which do not constitute departures from the spirit and scope of the invention.

What is claimed is:

1. A clip strap having a top portion with a hole therein, an upper corner with a spacer portion extending at an angle with respect to said top portion, said spacer portion having a hole therein, a retainer portion for retaining a pipe, said retainer portion having a lip with an edge thereon, said retainer portion being slightly smaller than the pipe to be retained when not retaining a pipe and adapted to open slightly when receiving a pipe, and means formed on the side of the retainer portion and positioned at the juncture of said retainer portion and said lip for retaining said pipe.

2. A clip strap made of flexible metal having a top portion with a hole therein, an upper corner with a spacer portion extending at an angle with respect to said top portion, said spacer portion being curved convexly with respect to said top portion and having a hole therein, a retainer portion for retaining a pipe, said retainer portion having a bottom hole and a forward lip with an edge thereon, said retainer portion being slightly smaller than the pipe to be retained when not retaining a pipe and adapted to open slightly when receiving a pipe, and means formed on the side of the retainer portion and positioned at the juncture of said retainer portion and said forward lip for retaining said pipe, said retainer portion having its back edge rearwardly of said upper corner.

3. A one-piece clip strap made of flexible metal having a flat top portion with a hole therein, an upper corner with a curved spacer portion extending at an angle with respect to said flat top portion, said spacer portion having a hole therein, a retainer portion for retaining a curved pipe or conduit, said retainer portion having a forward lip with an edge thereon, said retainer portion being slightly smaller than the pipe to be retained when not retaining a pipe and adapted to open slightly when receiving a pipe so as to grip said pipe.

4. A one-piece clip strap made of flexible metal having a top portion with a hole therein, an upper corner with a curved spacer portion extending at an angle with respect to said flat top portion, said spacer portion having a hole therein, a retainer portion for retaining a curved pipe or conduit, said retainer portion having a bottom hole and a forward lip with an edge thereon, said retainer portion being slightly smaller than the pipe to be retained when not retaining a pipe and adapted to open slightly when receiving a pipe so as to grip said pipe, and means formed on the side of the retainer portion and positioned at the juncture of said forward lip and said retainer portion for retaining a pipe in said retainer portion.

5. A clip strap having a top portion with a top hole therein, said top portion having an upper lip at its forward edge terminating in an upper edge, the rear of said top portion having an upper corner which forms the upper edge of a spacer portion extending at an angle with respect to said top portion, said spacer portion having a side hole therein, a retainer portion extending from the lower part of said spacer portion for retaining a pipe, said retainer portion having a back edge positioned rearwardly of said upper corner, said retainer portion having a bottom hole therein in alignment with the top hole in said top portion, said retainer portion having a lower lip bent forwardly and terminating in a lower edge, the distance between said upper edge and said lower edge on said upper and lower lips being greater than the diameter of said pipe, said curved spacer portion being adapted to act as a lock washer when a screw is inserted through the side hole thereof, said spacer portion tending to spring forwardly at said side hole from its contact with a supporting surface which said upper corner and said back edge contact.

6. A metal clip strap having a flat top portion with a top hole therein, said top portion having an upper lip at its forward edge terminating in an upper edge, the rear of said top portion having an upper corner which forms the upper edge of a spacer portion extending at an angle with respect to said top portion, said spacer portion being curved convexly forwardly and having a side hole therein, a retainer portion extending from the lower part of said spacer portion for retaining a pipe, said retainer portion having a curved back edge positioned rearwardly of said upper corner, said retainer portion having a bottom hole therein in vertical alignment with the top hole in said top portion, said retainer portion having a lower lip bent forwardly and terminating in a lower edge, means formed on the side of the retainer portion and positioned at the juncture of said retainer portion and said lower lip for retaining a pipe in said retainer portion, said means being positioned above the horizontal diameter of said pipe, the distance between said upper edge and said lower edge on said upper and lower lips being greater than the diameter of said pipe, said curved spacer portion being adapted to act as a lock washer when a screw is inserted through the side hole thereof, said spacer portion tending to spring forwardly at said side hole from its contact with a supporting surface which said upper corner and said back edge contact.

7. A metal clip strap having a top portion with a top hole therein, said top portion having a forward upper edge and a rear upper corner, a spacer portion extending angularly with respect to said top portion, said spacer portion being curved convexly forwardly and having a side hole therein, a retainer portion extending from the lower part of said spacer portion for retaining a pipe, said retainer portion having a back edge positioned rearwardly of said upper corner, said retainer portion having a bottom hole therein in vertical alignment with the top hole in said top portion, said retainer portion terminating in a lower edge, means formed on the side of the retainer portion and positioned at the juncture of said retainer portion and said lower lip for retaining a pipe in said retainer portion, said means being positioned above the horizontal diameter of said pipe, the distance between said upper edge and said lower edge being greater than the diameter of said pipe, said curved spacer portion being adapted to act as a lock washer when a screw is inserted through the side hole thereof, said spacer portion tending to spring forwardly at said side hole from its contact with a supporting surface which said upper corner and said back edge contact.

8. A one-piece clip strap made of flexible spring steel, said clip strap having a flat top portion with a top hole in the center thereof, said top portion having a downwardly extending lip at its forward edge terminating in an upper edge, the rear of said top portion having an upper corner which forms the upper edge of a spacer portion extending at an angle with respect to said top portion, said spacer portion being curved convexly forwardly and having a side hole therein, a substantially circular retainer portion extending from the lower part of said spacer portion for retaining a pipe, said retainer portion having a back edge positioned rearwardly of said upper corner, said retainer portion having a lower lip bent forwardly and terminating in a lower edge, means formed on the side of the retainer portion and positioned at the juncture of said retainer portion and said lower lip for retaining a pipe in said retainer portion, said means being positioned above the horizontal diameter of said pipe, the distance between said upper edge and said lower edge on said upper and lower lips being greater than the diameter of said pipe, said side hole being positioned below said upper edge and above said lower edge, said curved spacer portion being adapted to act as a lock washer when a screw is inserted through the side hole thereof, said spacer portion tending to spring forwardly at said side hole from its contact with a supporting surface which said upper corner and said back edge contact, the centers of said top hole and said bottom hole and said pipe being in substantial vertical alignment.

9. The clip strap set forth in claim 1 wherein said means for retaining said pipe comprises a burr at each side edge formed by an angularly extending slit forming a point at the inner end of said burr, said point tending to bite into the pipe upon removal of said pipe from said clip strap.

References Cited by the Examiner

UNITED STATES PATENTS

| | | | |
|---|---|---|---|
| 1,303,345 | 5/19 | McFeaters | 248—73 |
| 2,157,020 | 5/39 | Sanford | 211—123 |
| 2,273,571 | 2/42 | Hafemeister | 248—62 |
| 2,795,834 | 6/57 | Szoke | 248—316.5 X |
| 3,016,220 | 1/62 | Rose | 248—74 |
| 3,121,549 | 2/64 | Loudon | 248—74 |

FOREIGN PATENTS

| | | |
|---|---|---|
| 668,432 | 12/38 | Germany. |
| 107,311 | 10/24 | Switzerland. |

CLAUDE A. LE ROY, *Primary Examiner.*